ized.
UNITED STATES PATENT OFFICE.

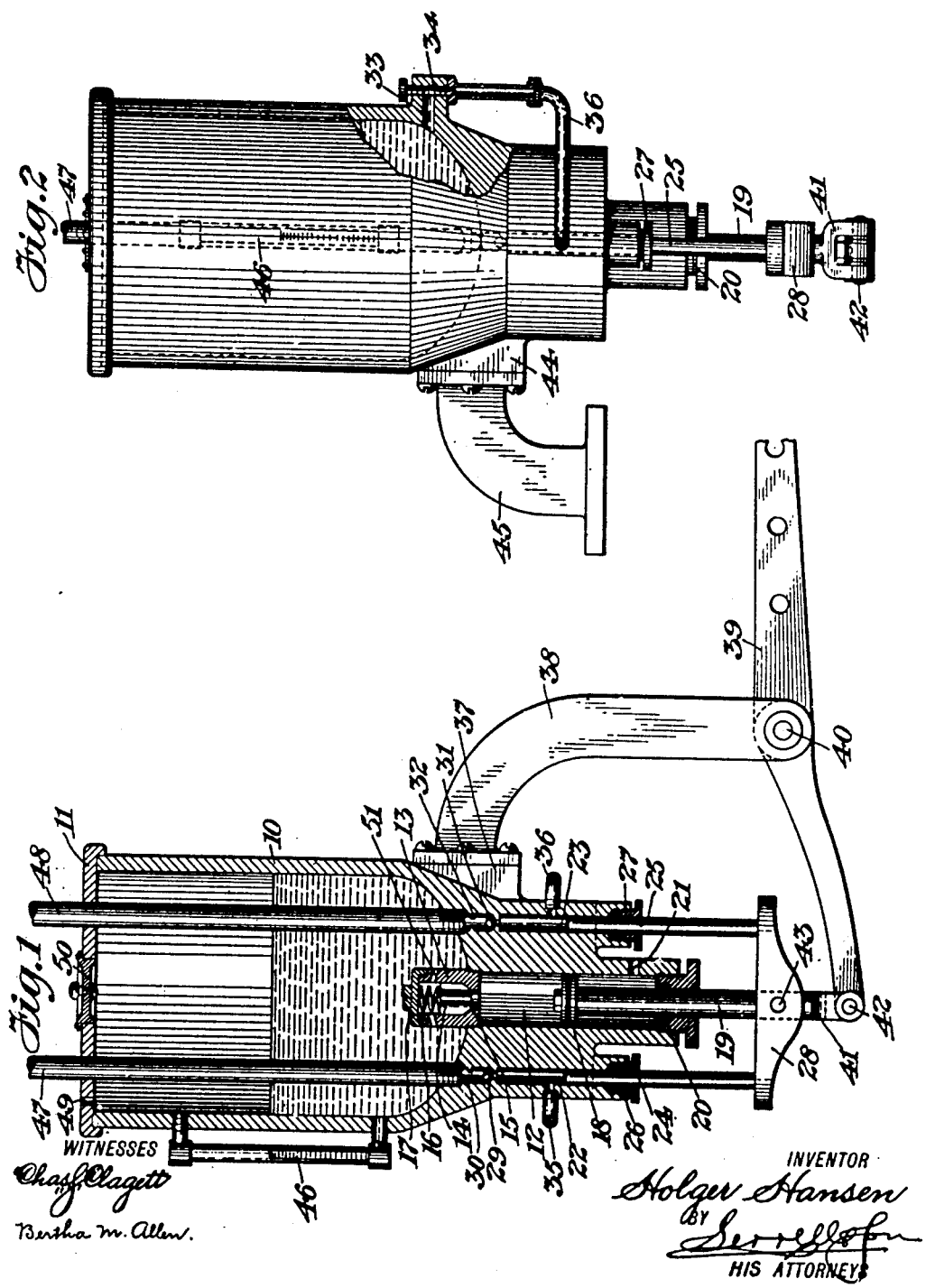

HOLGER HANSEN, OF NEW YORK, N. Y.

LUBRICATOR.

1,133,375.

Specification of Letters Patent.

Patented Mar. 30, 1915.

Application filed February 4, 1914. Serial No. 816,417.

*To all whom it may concern:*

Be it known that I, HOLGER HANSEN, a citizen of the United States, residing at the borough of Manhattan, in the city, county, and State of New York, have invented an Improvement in Lubricators, of which the following is a specification.

My present invention relates to a lubricator, in the use of which graphite is maintained in suspension in the lubricant employed with the apparatus.

In lubricating various types of machinery, as is well understood, it is advantageous to mix a certain amount of graphite with the lubricant. I am aware that heretofore lubricators have been constructed by employing various mechanical means for carrying out the objects of my present invention. For example, I am aware that mechanically actuated blades or paddles have been employed in lubricators in attempts to maintain graphite in suspension in the lubricant. In all of these devices, however, so far as I am aware, the space in which the graphite is maintained in suspension and properly mixed with the lubricant is retricted to the immediate area in which the mechanical devices are operated.

The object of my present invention is the provision of a lubricator in which I employ means for pneumatically maintaining the graphite in suspension in the lubricant, so that the mixture of the graphite and lubricant is practically uniform throughout its entire volume.

In carrying out my invention, I preferably employ a casing adapted to contain the lubricant, means for regularly supplying air to the interior of the casing, so that the same passes through the mixture of graphite and lubricant, devices for actuating the aforesaid means, as well as devices for positively supplying the mixed graphite and lubricant to the parts to be lubricated, as will be hereinafter more particularly described.

In the drawing, Figure 1 is a central longitudinal cross section illustrating my improved lubricator. Fig. 2 is an elevation in partial cross section of the same, taken in a position at 90° to that shown in Fig. 1.

Referring to the drawing, I prefer to employ, in carrying out my invention, a receptacle, indicated at 10. This, as will be understood, may be made of any suitable material, and is opened at one end and provided with a cover 11. In the base or lower end of the receptacle, a chamber 12 is provided. At the inner end of this chamber, a valve casing 13 is secured. Within the valve casing is a check valve 14 normally bearing against a valve seat 15 and maintained in position thereon by means of a spring 16 acting between the upper end of the valve and the inner surface of a cap 17, suitably secured on the valve casing 13. In the walls of this valve casing, in suitably spaced positions, are arranged a number of downwardly inclined discharge ports, indicated at 51. Within the chamber 12, I employ a piston 18, secured to which is a piston rod 19, which passes through a suitable packing gland 20. Adjacent the lower end of the casing, the same is provided with an air inlet port 21, making communication between the interior of the chamber 12 and the atmosphere. Also in the lower end or base of the receptacle 10 I provide supply chambers, indicated at 22 and 23, respectively, preferably extending longitudinally of the receptacle. In the chamber 22 is a plunger 24, and in the chamber 23 a similar plunger 25. The plunger 24 passes through a suitable packing gland 26, and similarly the plunger 24 passes through the packing gland 27. At their outer ends, the plungers 24 and 25 are suitably connected to a head 28. The head 28 is also connected to the piston rod 19, by means of a pin 43, or otherwise, so that the piston rod and plungers may be actuated simultaneously.

In the supply chamber 22 I employ a ball check valve 29, adapted to seat against the valve seat provided for therein, and in the supply chamber 22 there is also an internal flange or ring 30, which determines the extent of the movement of the valve 29 in one direction. Similarly, in the supply chamber 23, I employ a ball check valve 31, also adapted to bear against the valve seat provided therefor within the supply chamber 23, in which there is also an internal flange or ring 32 which determines the extent of the travel of the ball check valve 31 in one direction.

Suitably placed in the receptacle 10, there is a discharge outlet 33, controlled by a needle valve 34 or other similar device. This outlet connection permits of the supply of the mixed lubricant and graphite from the outlet 33, through suitable pipes 35 and 36, to the supply chambers 22 and 23 respectively, from which, as will be understood, suitable pipe connections may be made to the parts to be lubricated.

Connected in a suitable position to the receptacle 10 is a bracket lug 37, secured to which is an arm 38. A lever 39 is pivotally connected at the free end of the arm 38, as indicated at 40, and the free end of the lever 39 is connected within a yoke 41 at the end of the piston rod 19 by means of a pin 42 or otherwise. The receptacle 10 is also provided with a bracket lug 44, to which is connected a bracket 45 for supporting the lubricator by being suitably secured to any part of the mechanism to be lubricated.

As shown in the drawing, the receptacle 10 may be provided with a gage glass 46, and the pipes 47 and 48, from the respective supply chambers, may be passed through the interior of the receptacle and through the cover 11 thereof. As also indicated in Fig. 1, the cover 11 is provided with a port or vent opening 49, and may also be provided with an opening for filling the receptacle, this opening being normally closed by a plug, indicated at 50.

In the operation of the hereinbefore described lubricating apparatus, the piston rod 19, together with its piston 18, and the plungers 24 and 25, are simultaneously actuated by the lever 39, which is suitably connected to moving parts of the machine or devices to be lubricated. The travel of the piston is sufficient, when at the end of its downward stroke, to uncover the port 21, thereby admitting atmospheric air to the piston chamber 12. On the upward stroke of the piston, the air so admitted forces open the check valve 14, moving the same against the spring 16, permitting this air to escape into and through the mixture of graphite and lubricant and to pass from the interior of the receptacle through the vent 49.

As the distribution of the air is uniform and regular, the graphite will be maintained in suspension in the lubricant so that the mixture thereof will be uniform. As will also be apparent, the mixture of graphite and lubricant is fed through the outlet 33, controlled by the needle valve 34, and conveyed by the pipes 35 and 36 to the supply chambers 22 and 23, from which, each time the plungers 24 and 25 move upwardly, a predetermined quantity of the lubricant is forced by the check valves 29 and 31, into the pipes 47 and 48, respectively, and thence to the parts to be lubricated.

It will furthermore be understood that while I have shown and described two supply chambers and pipes leading therefrom, that any number of these supply chambers and supply pipes may be employed without departing from the nature and spirit of my invention.

I claim as my invention:

1. A lubricator comprising a casing, means for supplying air to the lower portion of the interior thereof, supply chambers in the base of the casing, means for forcing the lubricant from the said supply chambers, and devices for simultaneously actuating both the aforesaid means.

2. A lubricator comprising a casing, means for intermittently supplying air to the lower portion of the interior thereof, supply chambers in the base of the casing, means for forcing the lubricant from the said supply chambers, regulatable devices for supplying oil from the interior of the casing to the said supply chambers, and devices for simultaneously actuating both the aforesaid means.

3. A lubricator comprising a casing having an air chamber in the base thereof and an inlet port making communication between the said air chamber and the atmosphere, a piston in the said air chamber, a valve casing fixed at the inner end of the said air chamber, a check valve therein, and means for moving the said piston to intermittently force air from the said air chamber by the said check valve into the lower portion of the said casing.

4. A lubricator comprising a casing having an air chamber in the base thereof and an inlet port making communication between the said air chamber and the atmosphere, a piston in the said air chamber, a valve casing fixed at the inner end of the said air chamber, a check valve therein, supply chambers in the base of the said casing, plungers operative within the said supply chambers for forcing the lubricant therefrom, and means for actuating the said piston and plungers.

5. A lubricator comprising a casing having an air chamber in the base thereof and an inlet port making communication between the said air chamber and the atmosphere, a piston in the said air chamber, a piston rod, a valve casing fixed at the inner end of the said air chamber, a check valve therein, supply chambers in the base of the said casing, plungers operative within the said supply chambers for forcing the lubricant therefrom, a head to which the said plungers are connected and which is connected to the said piston rod, and devices for reciprocating the said piston rod and simultaneously moving the said head and plungers.

Signed by me this 10th day of January, 1914.

HOLGER HANSEN.

Witnesses:
BERTHA M. ALLEN,
MARIE D. WOHLERS.

Copies of this patent may be obtained for five cents each, by addressing the "Commissioner of Patents, Washington, D. C."